(12) United States Patent
Flies

(10) Patent No.: US 8,646,414 B1
(45) Date of Patent: Feb. 11, 2014

(54) ANIMAL UNDERCOAT REMOVAL SYSTEM AND APPLICATOR THEREFOR

(76) Inventor: Wilma K. Flies, West Plains, MO (US)

(*) Notice: Subject to any disclaimer, the term of this patent is extended or adjusted under 35 U.S.C. 154(b) by 164 days.

(21) Appl. No.: 13/108,681

(22) Filed: May 16, 2011

Related U.S. Application Data

(60) Provisional application No. 61/346,572, filed on May 20, 2010.

(51) Int. Cl.
*A01K 13/00* (2006.01)

(52) U.S. Cl.
USPC .......................... 119/603; 119/665; 119/604

(58) Field of Classification Search
USPC ............... 119/600, 602–604, 601, 650, 651, 119/665–671; 239/333, 583, 541, 335, 239/419.5, 428.5; 118/300
See application file for complete search history.

(56) References Cited

U.S. PATENT DOCUMENTS

| | | | | |
|---|---|---|---|---|
| 2,989,249 A | * | 6/1961 | Richter | 239/427 |
| 3,672,575 A | * | 6/1972 | Hinrichs | 239/445 |
| 5,020,726 A | * | 6/1991 | Myres | 239/525 |
| 5,261,494 A | * | 11/1993 | McLoughlin et al. | 169/70 |
| 5,826,799 A | * | 10/1998 | Hsieh | 239/428.5 |
| 7,032,840 B2 | | 4/2006 | Freidell | |
| 7,614,570 B2 | * | 11/2009 | Freidell | 239/307 |
| 7,635,671 B2 | * | 12/2009 | Miyazaki et al. | 510/320 |
| 7,647,892 B2 | | 1/2010 | Inahara et al. | |
| 2005/0000466 A1 | * | 1/2005 | Falkenberg | 119/600 |
| 2005/0001064 A1 | * | 1/2005 | Taketomi et al. | 239/461 |
| 2009/0014559 A1 | * | 1/2009 | Marino | 239/514 |
| 2012/0138710 A1 | * | 6/2012 | Hicks et al. | 239/455 |

FOREIGN PATENT DOCUMENTS

JP 61-6560 * 1/1986 ............ E03C 1/086

OTHER PUBLICATIONS

Bon-Aire WSG-1C Spray & Wash Soap Dispensing Wash Gun manufactured by Bon-Aire Industries, 873 East Citation Court, Boise, Idaho 83716.

* cited by examiner

*Primary Examiner* — Andrea Valenti
(74) *Attorney, Agent, or Firm* — Richard L. Marsh

(57) ABSTRACT

An animal undercoat removal system comprises a conditioning/removal apparatus, a hot and cold water source, shampoo & conditioning agent reservoirs, connecting hosing or piping and housing and mounting hardware for a groomers bathing area. The apparatus further comprises a dual function high flow, low pressure nozzle/low flow, high pressure nozzle, a venturi in the flow stream with a suction port for drawing shampoo/conditioner from reservoirs to assist in loosening of the undercoat.

16 Claims, 6 Drawing Sheets

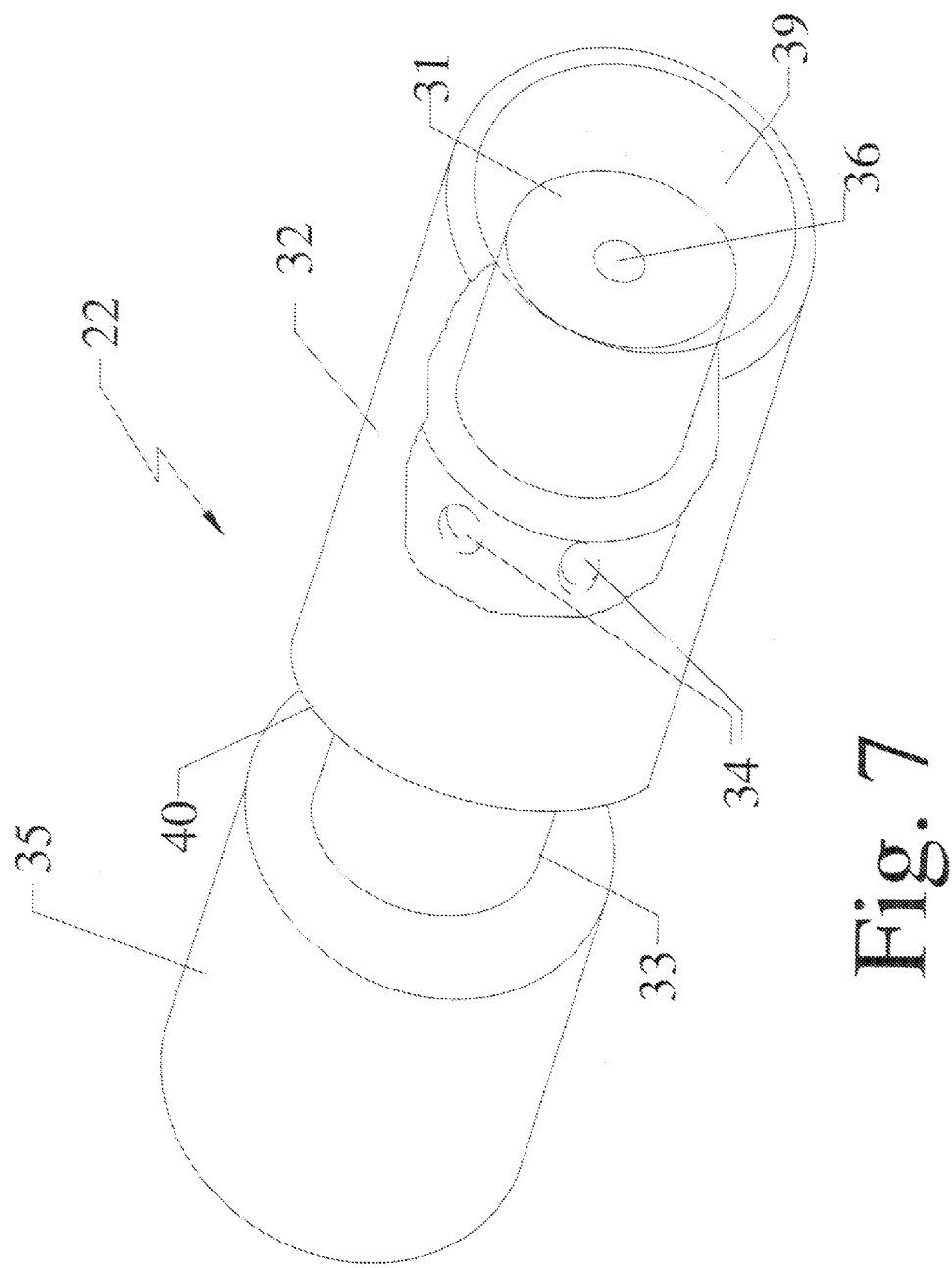

ANIMAL UNDERCOAT REMOVAL SYSTEM AND APPLICATOR THEREFOR

BACKGROUND OF THE INVENTION

1. Field of the Invention

This invention relates to a method and apparatus for removing the undercoat from animals in a process of grooming the animal. The method primarily uses a low flow/high flow nozzle for application of a conditioner and removal of the undercoat.

2. Prior Art Statement

It is well known to apply a conditioner to the coat of an animal with a spray bottle or the like prior to beginning removal of the undercoat, however, the process is tedious and lengthy as the undercoat is removed mechanically using a slicker brush, stripping knife, air blower and/or pin brush. Using these tools, three or four hours are required in many cases in order to effectively de-matt and brush out to remove the dead hair and prepare the animal for finish grooming. In addition, repeated striking of the skin of the animal with these tools is uncomfortable for the animal and often results in damage to the skin. Furthermore, the heated air from the blower dries the skin of the animal even if the dryer is not set on hot. Also, the additional labor cost must be passed on to the owner resulting in high fees for grooming. Thus, there is a great need for a method and apparatus for easily removing the undercoat from a long haired animal which is also more comfortable for the animal, does not damage the skin and reduces costs for both the groomer and owner.

It is also known to soak an animal's coat with vegetable or mineral oil for 24 hours to treat an animal for salt, mud, tar, tree sap and burrs. The oil is then washed away using soap and water.

It is also known to provide a surfactant in a ultra high pressure washing system wherein a pump provides high pressure water to a mixing valve wherein the surfactant is drawn into the high pressure water stream in the mixing valve. The ultra high pressure of a pressure washing system is not suitable for removal of the undercoat of an animal. Therefore, there exists a great need for an animal undercoat removal system having a dual function nozzle wherein one mode of the dual function nozzle provides a low pressure, high flow suction flow stream for application of a conditioner and a second mode provides a higher pressure, low flow stream for spiriting away of the undercoat.

It is also known to provide an animal bathing system for projecting a mixture of water and at least one injectant upon an object to be washed such as an animal. For instance, see U.S. Pat. No. 7,032,840 issued on 26 Apr. 2006 to James E. Freidell. In this system a commercially available shower head is used for washing wherein a flow restrictor has been removed from the shower head to reduce back pressure to allow the injectant to be injected into the water. Pumps are also provided to inject the injectant into the water. Flow is restricted before the point of injection and although useful for bathing an animal, it has been found that this system cannot remove the undercoat of the animal. A bypass is required to rinse the shampoo from the animal. Therefore, there is a great need for an animal undercoat removal system that provides both low pressure, high flow and high pressure, low flow at the nozzle for introduction of a surfactant deep into an animal's undercoat during the low pressure mode and spiriting away of the undercoat in the high pressure mode.

It is further known to provide an animal washing system with an injector subsystem operable to generate a water/shampoo mixture and an aeration subsystem adapted to receive pressurized air for introduction into the water/shampoo mixture to generate an aerated-water-shampoo mixture. For instance, see the U.S. Pat. No. 7,647,892 B2, issued on 19 Jan. 2010 to Inahara, et al. The system relies upon pressurized air to foam the surfactant and a bypass valve to rinse the animal. Thus, the need for a dual function nozzle having both high flow and low flow modes available by manually moving a sleeve of the nozzle along a core of the nozzle is still great wherein the dual function nozzle provides shampoo/conditioner in one mode and rinsing in a second mode.

Finally, it is known to provide a soap dispensing wash gun that provides a surfactant and a concentrated water stream primarily for washing automobiles, however, it has been used for washing horses. For instance, see the Bon-Aire WSG-1C Spray & Wash Soap Dispensing Wash Gun manufactured by Bon-Aire Industries, 873 East Citation Court, Boise, Id. 83716 and available through online retailers. The wash gun has insufficient pressure to penetrate into a coat of a long haired animal and thus cannot be used for undercoat removal.

SUMMARY OF THE INVENTION

The art of grooming an animal is of great importance to the health and beauty of the animal. Grooming may be quite difficult and time consuming in long haired animals, especially if the animal is not regularly brushed and combed as the undercoat must be removed before finish grooming can proceed. The undercoat primarily consists of dead hair lying between the skin of the animal and the live hair visible to the eye.

An aim of this invention is to provide a low pressure, high flow device for application of a shampoo and/or conditioning agent to the coat of the animal.

An aspect of this invention is to provide a high pressure, low flow device for removal of the undercoat of a long haired animal.

A feature of this invention is to provide a combination low pressure, high flow device for application of a conditioning agent to the coat of long haired animal and high pressure, low flow device for more effective removal of the undercoat of the animal.

An object of this invention is to provide an animal undercoat removal system that comprises a dual function nozzle and a venturi wherein the dual function nozzle has high flow and low flow modes. The nozzle cooperates with the venturi to provide for suction of a surfactant into a flow stream in the high flow mode and denies incorporation of the surfactant into the flow stream in the low flow mode.

A goal of this invention is to provide an animal undercoat removal system that comprises a dual function nozzle and a venturi wherein the dual function nozzle has high flow and low flow modes wherein the nozzle is switchable from the high flow mode to the low flow mode by axially moving a sleeve along a core element of the nozzle.

A purpose of this invention is to provide an animal undercoat removal system that comprises a dual function nozzle having high flow and low flow modes wherein the core element of the nozzle has radial apertures disposed therethrough.

A principle of this invention is to provide an animal undercoat removal system that comprises a dual function nozzle having high flow and low flow modes wherein a sleeve overlying a core element has an inner surface substantially greater in inside dimension than an outer surface of the core element.

A primary aim of this invention is to provide an animal undercoat removal system wherein radial apertures disposed through a core element admit air into a flow stream through the nozzle to foam a surfactant carried by the flow stream.

A primary aim of this invention is to provide an animal undercoat removal system wherein the air admitted into the flow stream through the radial apertures disposed through a core element of the nozzle is ambient air.

A primary aim of this invention is to provide an animal undercoat removal system comprising a nozzle and venturi, the nozzle having low flow and high flow modes wherein the nozzle is disposed remote from the venturi.

A primary aim of this invention is to provide an animal undercoat removal system an animal undercoat removal system comprising a nozzle and venturi, the nozzle having low pressure and high pressure modes, the nozzle cooperating with venturi to provide for suction of a surfactant into a flow stream through the nozzle in the low pressure mode and denies incorporation of surfactant into the flow stream in the high pressure mode.

A primary goal of this invention is to provide an animal undercoat removal system comprising a dual flow mode nozzle and a venturi, the nozzle further comprising a core element and a sleeve element, the sleeve element axially slidable relative to the core element, the core element of the nozzle provided with fluid introduction apertures in an outer wall thereof, the sleeve element having at least one fluid passage associated therewith wherein movement of the sleeve element in one direction relative to the core element blocks the fluid introduction passages and thus reduces flow of a first fluid through the core element thus increasing a pressure of the first fluid and wherein movement of the sleeve element in an opposed direction relative to the core element at least partially uncovers the fluid introduction passages thus increasing the flow of the first fluid through the core element thereby reducing the pressure of the first fluid wherein the first fluid is foamed by introduction of a second fluid into the first fluid through the fluid introduction apertures. The fluid passage may be a space provided from a free end of the nozzle between an inner surface of the sleeve element and an outer surface of the core element or may be a plurality of axial spaces provided through a closed end of the nozzle between an inner surface of the sleeve element and an outer surface of the core element.

A primary goal of this invention is to provide a simplified method of removal of the undercoat of a long haired animal.

A significant feature of this invention is to reduce labor effort and labor cost in the removal of the undercoat of an animal.

A main purpose of this invention is to reduce stress on the animal and eliminate pain from the animal during removal of the animal's undercoat.

A primary principle of this invention is to greatly reduce the time required for removal of the undercoat of an animal thereby resulting in greater productivity from groomers.

BRIEF DESCRIPTION OF THE DRAWINGS

FIG. 7 is a perspective view of the nozzle of the undercoat removal system having portions of a sleeve thereof broken away to show fluid introduction apertures in a core element thereof covered by a back wall of the sleeve.

DESCRIPTION OF THE PREFERRED EMBODIMENTS

Figure 1:
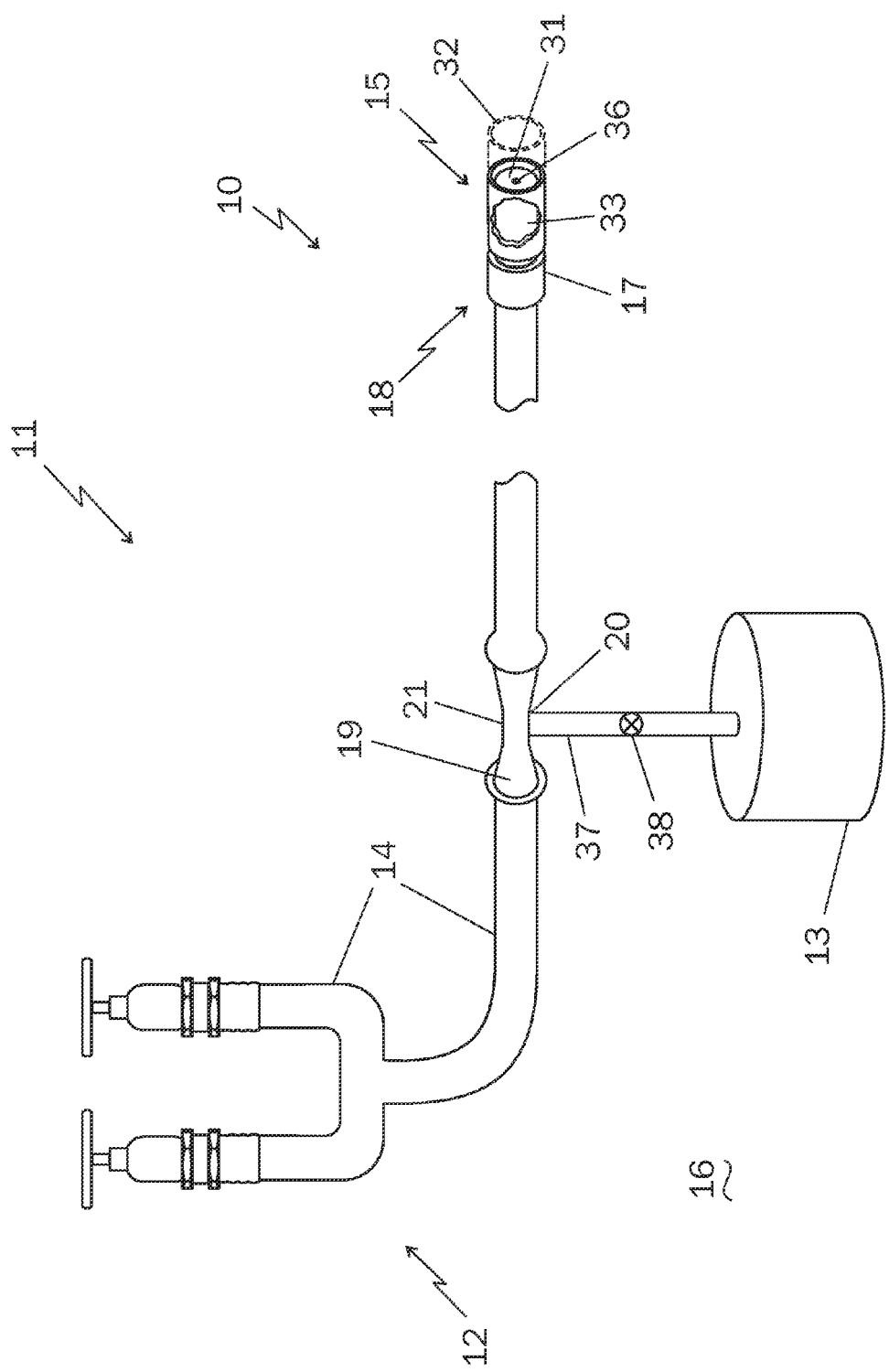
FIG. 1 is a schematic of the preferred embodiment of the undercoat removal system showing the venturi component remote from the wash nozzle.

Referring now to FIG. 1, an animal undercoat removal system 10 comprises a application apparatus 11, a water source 12 providing hot and cold water, a reservoir 13 for shampoo and/or conditioning agent, connecting hosing or piping 14 and has housing and mounting hardware (not shown) for a groomers bathing area 16. Application apparatus 11 further comprises a dual function high flow, low pressure/low flow, high pressure nozzle 17 and a venturi 19, nozzle 17 shown in a low flow, high pressure mode 18 wherein a sleeve 32 of nozzle 17 is moved relative to a core 33 to a position adjacent a terminal end 31 of nozzle 17. Preferably, venturi 19 is disposed in a flow stream between a water source 12 and nozzle 17 wherein venturi 19 has a suction port 20 adjacent a constriction 21 for drawing shampoo and/or conditioner from reservoir 13 to assist in loosening of the undercoat of the animal. Low flow, high pressure mode 18 of nozzle 17 provides a concentrated stream of water for spiriting away loosened undercoat after application and soak time for the conditioner as applied in a high flow, low pressure mode 15 of nozzle 17, high flow, low pressure mode 15 to be fully set forth hereinafter.

Figure 2:
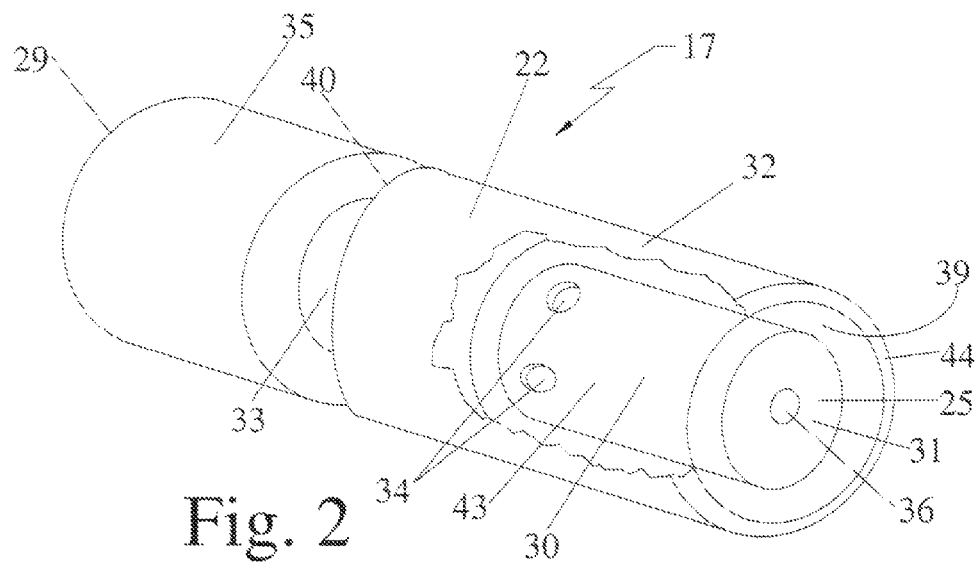
FIG. 2 is a perspective view of the nozzle of the undercoat removal system having portions of a sleeve thereof broken away to show fluid introduction apertures in a core element thereof.

In the preferred embodiment of FIG. 2, conditioning agent is drawn into the water flow stream through venturi 19 mounted remote from nozzle 17. In this configuration, one reservoir 13 may be used for multiple groomer bathing areas 16 wherein each venturi 19 is connected to reservoir 13. Where used for only one groomer's bathing station 16, remote mounting of venturi 19 and reservoir 13 provides greater space for the groomer and animal being groomed. As will become evident hereinafter, nozzle 17 is easily held by one hand of the groomer and may also be easily switched between high flow, low pressure mode 15 and low flow, high pressure mode 18 with the thumb of that hand, however, it is within the scope of this invention to hold nozzle 17 in one hand of the groomer while switching between high flow, low pressure mode 15 and low flow, high pressure mode 18 with the other hand. Though venturi 19 may be specially made for undercoat removal system 10, it has been found that commercially available mixing devices may best be used to advantage as the cost of an injection mold for a specially made venturi 19 will be very high. Commercially available mixing devices used in commercial and household laundries are available through Seko Dosing Systems Corporation, 1103 Branagan Drive, Tullytown Pa., 19007. Particularly useful in animal undercoat removal system 10 is Model PSPB216U0000 Pro Spray 2 available from Seko Dosing Systems though other models from Seko Dosing Systems or other manufacturers may also be used.

Referring specifically to the details of nozzle 17 of the preferred embodiment, and specifically to FIGS. 2 and 7, sleeve 32 has an undercut portion 39 bounded by a back wall 40 thereof such that water may flow readily from flow holes 34 along core 33 toward terminal end 31 as well as from orifice 36 in terminal end 31 in high flow, low pressure mode 15. Back wall 40 has an internal diameter substantially equal to an outside diameter of core 33 and extends inwardly toward a terminal end 44 of sleeve 32. As shown in FIG. 2, to configure nozzle 17 into high flow, low pressure mode 15, sleeve 32 is moved toward a base 35 of unit 12 to uncover flow holes 34 provided in core element 33 which allows some water to flow from all flow holes 34 in core element 33 through undercut portion 39 along with water through orifice 36 in terminal end 31. As sleeve 32 approaches within about three-eighths inch of base 35 as depicted in FIG. 2, flow holes 34 in core element 33 begin to be uncovered thus allowing partial flow through flow holes 34. Full flow occurs through flow holes 34 as sleeve 32 abuts base 35 of nozzle 17. Undercut portion 39 is sufficiently greater in inside dimension than an outer dimension of core element 33 to also admit air into shampoo/conditioning flow stream 27 from terminal end 31 thus foaming shampoo/conditioner drawn into shampoo/conditioning flow stream 27. It should be readily apparent that during high flow, low pressure mode 15, a vacuum is created in constriction 21 of venturi 19 drawing shampoo/conditioning agent from reservoir 13. The shampoo/conditioning agent mixes with the water stream and is applied to the animal in copious amounts to fully penetrate the coat of the animal thus reaching below the undercoat to the skin. The shampoo/conditioning agent loosens the dead hair from the animal's skin and lubricates the remaining coat of the animal thus providing for easier removal of the undercoat. It has been found very beneficial by the inventor hereof that at partial flow of water and shampoo/conditioner through flow holes 34 in core element 33, penetration into the undercoat of the animal is greatly enhanced thus positioning the foamed shampoo/conditioner at the skin of the animal. Though conventional tools may then be used to remove the undercoat, it has been found by the inventor hereof that a high pressure stream of tepid water will remove the conditioned undercoat with a great deal less effort and time by switching to high pressure, low volume mode 18.

Referring back to FIG. 1 and also to FIG. 7, high pressure, low volume mode 18 is created by moving sleeve 32 axially along core element 33 toward terminal end 31 to cover flow holes 34 in core element 33 with butt end 22 thereby stopping flow of water through flow holes 34 and directing the entire water stream through orifice 36 in terminal end 31 thus increasing the pressure of the water stream emitted from orifice 36. High pressure, low volume mode 18 is shown in FIG. 1 in dashed lines wherein terminal end 31 of core element 33 is deeply inside sleeve 32 and therefore would not be visible in the perspective of FIG. 1. During an initial period of low flow, high pressure, the remaining portion of shampoo/conditioner flows onto the animal further helping in penetrating and loosening the undercoat of the animal. The high pressure water stream is effective in washing the undercoat from the animal's coat as will be fully explained in a method of use hereinafter. Application apparatus 11 achieves one feature of this invention by providing high flow and low flow for shampooing/conditioning and removal of the undercoat of an animal, respectively.

Nozzle 17 is preferably CNC machined from one and three-eighths diameter steel bar stock wherein core element 33 is approximately four inches in length. Core element 33 is provided with an internal hose connection thread at a connection end 29 opposite orifice 36 and has a one-half inch diameter bore extending from an internal end of the internal hose connection thread approximately two and one-half inches terminating at an orifice wall 25 at terminal end 31. Orifice wall 25 has orifice 36 disposed therethrough, orifice 36 connecting with the internal one-half inch diameter bore. Orifice wall 25 preferably is provided with a tapered transition between the internal bore and orifice 36. Core element 33 is provided with at least one high flow hole 34 disposed through a wall 30 of reduced diameter core 43 of core element 33, flow hole 34 approximately one-quarter inch in diameter. Preferably, core 43 of core element 33 is provided with four high flow holes 34 arranged equally around core 43, flow holes 34 disposed through wall 30 approximately at an internal surface of orifice wall 25. Core 43 is approximately three-quarters inch in diameter and is provided with a retaining groove disposed therearound, the retaining groove located inwardly from terminal end 31 approximately one-half inch. The retaining groove may receive a snap ring or O-ring therein to retain sleeve 32 axially upon core 43. Sleeve 32 is also preferably CNC machined from one and three-eighths diameter steel bar stock, sleeve 32 approximately two and three-quarters inches in length. Sleeve 32 is provided with a first bore 46 therethrough, best shown in FIG. 3, substantially equal to a diameter of core 43, first bore 46 extending through butt end 22, butt end 22 approximately one inch in length thus adapted to retain sleeve 32 in a radially fixed position upon core 43. Sleeve 32 is further provided with undercut portion 39 which extends from an internal wall of butt end 22 fully to a terminal end 44 of sleeve 32. Undercut portion 39 is sufficiently larger in an internal dimension than core 43 thus allowing sufficient space to slide an O-ring or snap ring along core 43 and into the retaining groove to fix sleeve 32 upon core 43. As hereinbefore stated, undercut portion 39 allows fluid from application apparatus 11 to flow along core 43 exiting along with additional fluid through orifice 36 when configured into high flow, low pressure mode 15. Though the preferred dimensions are provided here, it should fully understood that greater or lesser dimensions are fully within the scope of this invention. Additionally, though the preferred method of manufacture is by CNC machining, it is fully within the scope of this invention to manufacture sleeve 32 and/or core element 33 from materials selected from the group of rigid materials consisting of metals, polymers, wood, carbon fiber, stone, glass, fibrous materials and composites or combinations thereof.

Figure 3:
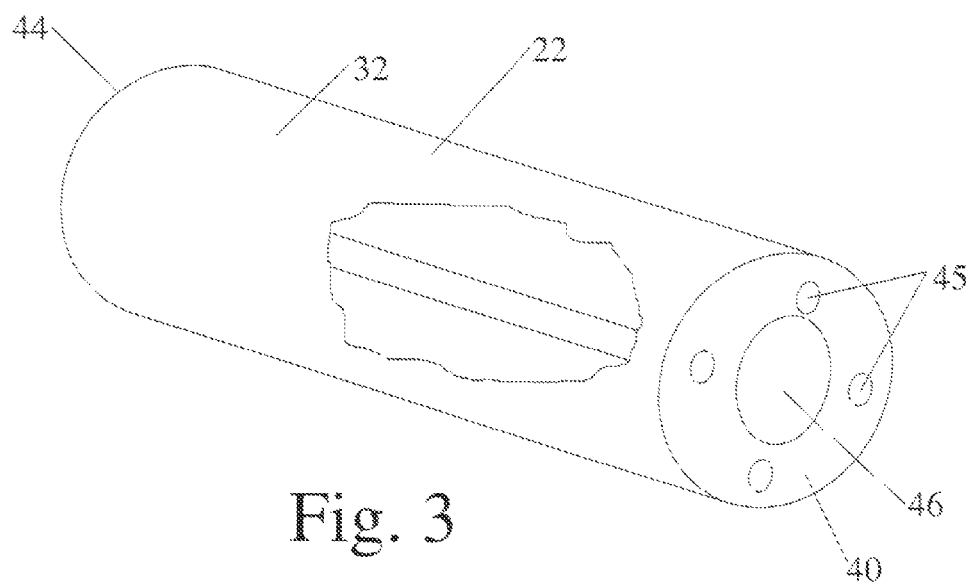
FIG. 3 is a perspective view of a second embodiment of the sleeve of the nozzle of the undercoat removal system having portions broken away to show second fluid introduction apertures in the sleeve.

Referring now to FIG. 3, nozzle 17 may further be provided with second fluid apertures 45 disposed into butt end 22 of sleeve 32, second apertures 45 adapted to allow ambient air to flow into undercut portion 39 of sleeve 32 to further admix ambient air with shampoo/conditioning agent in shampoo/conditioning flow stream 27. Second fluid apertures 45 are preferably one-eighth inch diameter holes passing through butt end 22 from back wall 40 into undercut portion 39. Second fluid apertures 45 are closed when back wall 40 fully abuts base 35 but admit ambient air into undercut portion 39 when sleeve 32 is moved toward terminal end 31. Second fluid apertures 45 continue to supply ambient air into undercut portion 39 as long as flow holes 34 are open, however, when flow stops through undercut portion 39, second fluid apertures 45 no longer provide ambient air into undercut portion 39 as there is no flow therethrough when nozzle 17 is configured into high pressure, low flow mode 18.

Figure 4:
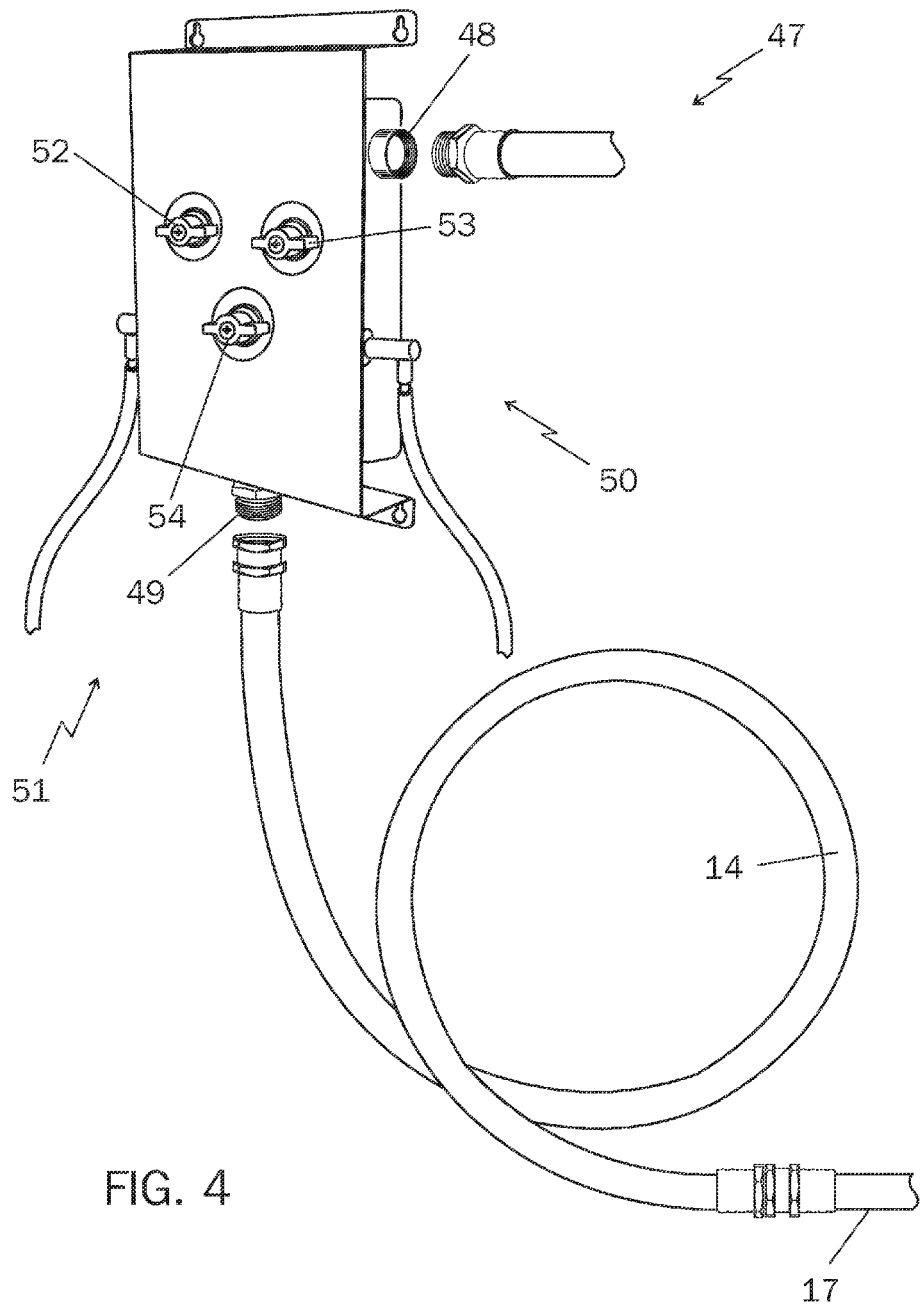
FIG. 4 is a frontal plan view an embodiment of the undercoat removal system showing the venturi component incorporated into a commercially available mixing system.

As hereinbefore mentioned, it is within the scope of this invention to use commercially available mixing devices in conjunction with nozzle 17 to provide undercoat removal system 10 of this invention. In FIG. 4, a commercially available dosing device is shown as numeral 47, commercially available dosing device 47 purchased as Model PSPB216U0000 Pro Spray 2 available from Seko Dosing Systems. Dosing device 47 has a water input connection 48, a fluid outlet connection 49, first agent connection and pick up tube 50, second agent connection and pick up tube 51 and control knobs 52-54 for various flow streams. Mixing device 47 has two venturi for separate agents and has a venturi bypass centrally disposed in the device. When used with undercoat removal system 10 of this invention, first agent connection and pick up tube 50 is used to supply only shampoo to nozzle 17 through outlet hose 14, wherein the supply of shampoo to a venturi associated with first agent connection and pickup tube 50 may be switched on and off by valve 38 underlying control knob 53, however, as hereinbefore stated, nozzle 17 is preferably switched between high flow, low pressure mode 15 to low flow, high pressure mode 18 to control flow of shampoo into the shampoo/conditioning flow stream 27 through hosing 14 and nozzle 17. Commercial dosing device 47 is best used when a separate conditioning agent is needed wherein second agent connection and pick up tube 51 is activated by switching a flow stream through a venturi underlying control knob 52 which routes water from water input connection 48 through the venturi under control knob 52 and out through nozzle supply hosing 14 to nozzle 17. Again, presence or absence of the conditioning agent may be fully controlled at nozzle 17 by switching between high flow and low flow modes 15, 18 respectively. Commercially available dosing device 47 is also quite useful in cleaning up groomer's station 16 in high flow, low pressure mode 15 by switching off both control knobs 52, 53 and switching on control knob 54 as a water flow path exists directly from water input connection 48 to flow stream outlet connection 49 in piping under control knob 54. Thus, nozzle 17 may be used to quickly flow accumulated debris from groomer's station 16 in high flow, low pressure mode 15 without drawing any agent into the flow stream and low flow, high pressure mode 18 may be used to dislodge debris from difficult to reach areas.

Figure 5:
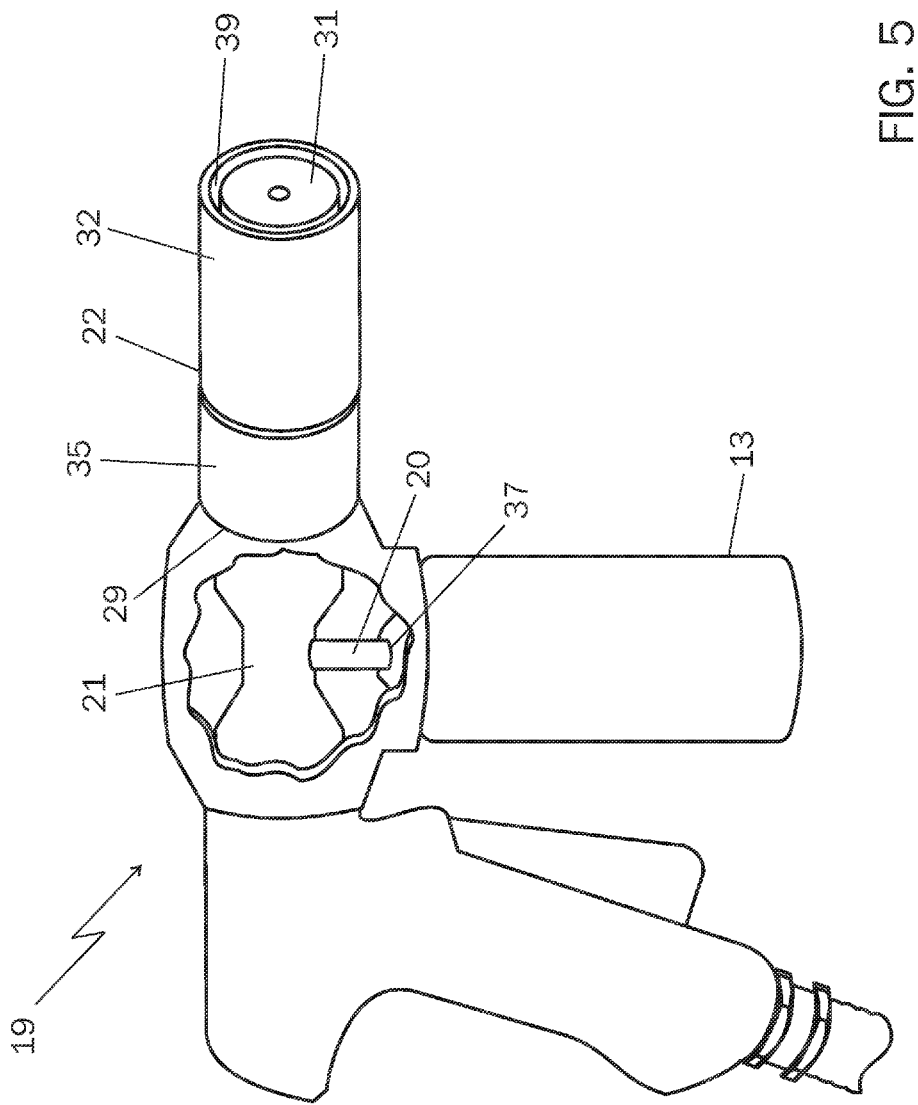
FIG. 5 is a schematic of a second embodiment of the undercoat removal system showing the venturi component incorporated into the wash nozzle.

With reference to FIG. 5, undercoat removal system 10 of this invention may be a combination unit nozzle 17, venturi 19 and reservoir 13 wherein venturi 19 is directly connected to nozzle 17 at connection end 29 thereof and wherein venturi 19 has reservoir 13 affixed thereto at suction port 20. Suction tube 37 depends from suction port 20 directly into reservoir 13 wherein action of venturi 19 in high flow, low pressure mode 15 draws agent from reservoir 13 into a flow stream through venturi 19 and nozzle 17. Action of venturi 19 is fully controlled by nozzle 17 as herein described and thus undercoat removal system 10 of this invention is fully functional as described below. In FIG. 5, nozzle 17 is shown configured into high flow, low pressure mode 15 and thus will draw agent from reservoir 13 upon activation of a water stream into venturi 19.

In a method of removal of the undercoat of an animal, the animal is first brought to a groomer's bath station 16 and made comfortable in the enclosure. Reservoir 13 is filled with a proper shampoo/conditioning agent and suction tube 37 is coupled to suction port 20 of venturi 19 with a free end thereof inserted into reservoir 13. A valve 38, shown only in FIG. 1, is provided in suction tube 37 to prevent flow of shampoo/conditioning agent while regulating the water temperature as described below. Nozzle 17 of application apparatus 11 is removed from a hanger of a mounting hardware with the groomer having a firm grasp on nozzle 17 of application apparatus 11. Water source 12 is activated while holding nozzle 17 and hot and cold water regulated to provide for tepid water for the conditioning and removal process. The temperature of the water may be measured by thermometer, however, a groomer generally regulates the water temperature by feel. Sleeve 32 is moved axially along core element 33 toward base 35 uncovering flow holes 34 in core element 33 thus allowing a greater volume of water to flow over terminal end 31 of core element 33. As a greater volume of water is now flowing, valve 38 on suction tube 37 is opened and drawing of shampoo/conditioner from reservoir 13 begins. The shampoo/conditioning agent is applied to the animal beginning at the nape of the neck and then moving longitudinally along the back bone on one side of the animal until reaching the tail. The stream emanating from nozzle 17 of application apparatus 11 is then moved slightly downward along the side of the animal and then moved toward the head of the animal until reaching same. This process is repeated in increasingly downward movements until the first side of the animal has been fully covered and the process is then repeated on the opposite side of the animal. When shampooing/conditioning is complete, sleeve 32 is moved forward along core element 33 until flow holes 34 are covered thus directing the entire water stream out orifice 36 in terminal end 31 of core element 33, and as flow holes 34 have been covered up, pressure increases and flow decreases. Since pressure has increased and lower flow now occurs, suction of conditioning agent from reservoir 13 stops. With the high pressure water stream coming only from orifice 36 in terminal end 31 of core element 33, the groomer begins again at the nape of the neck of the animal and proceeds to move water stream from application apparatus 11 laterally across the animal going down both sides of the animal while working rearwardly along the length of the animal. It has been found by the inventor hereof that the undercoat of the animal quickly falls away under the effects of the high pressure water stream assisted by the shampoo/conditioning agent previously applied. Where three to four hours is usually required to remove the undercoat manually with conventional tools, the application of shampoo/conditioning agent coupled with the high pressure water stream from application apparatus 11 reduces the time required to an hour or less. When the undercoat has fully fallen from the animal, it is best to quickly wrap the animal in toweling before the natural act of shaking occurs to minimize rapid skin temperature drop and to assist in drying the animal. Therefore, several objects of this invention have been accomplished. First, reduction of the time required for removal of the undercoat of an animal, second greater productivity from groomers, third, lower labor effort and lower cost, and additionally, less stress and discomfort for the animal.

Figure 6:
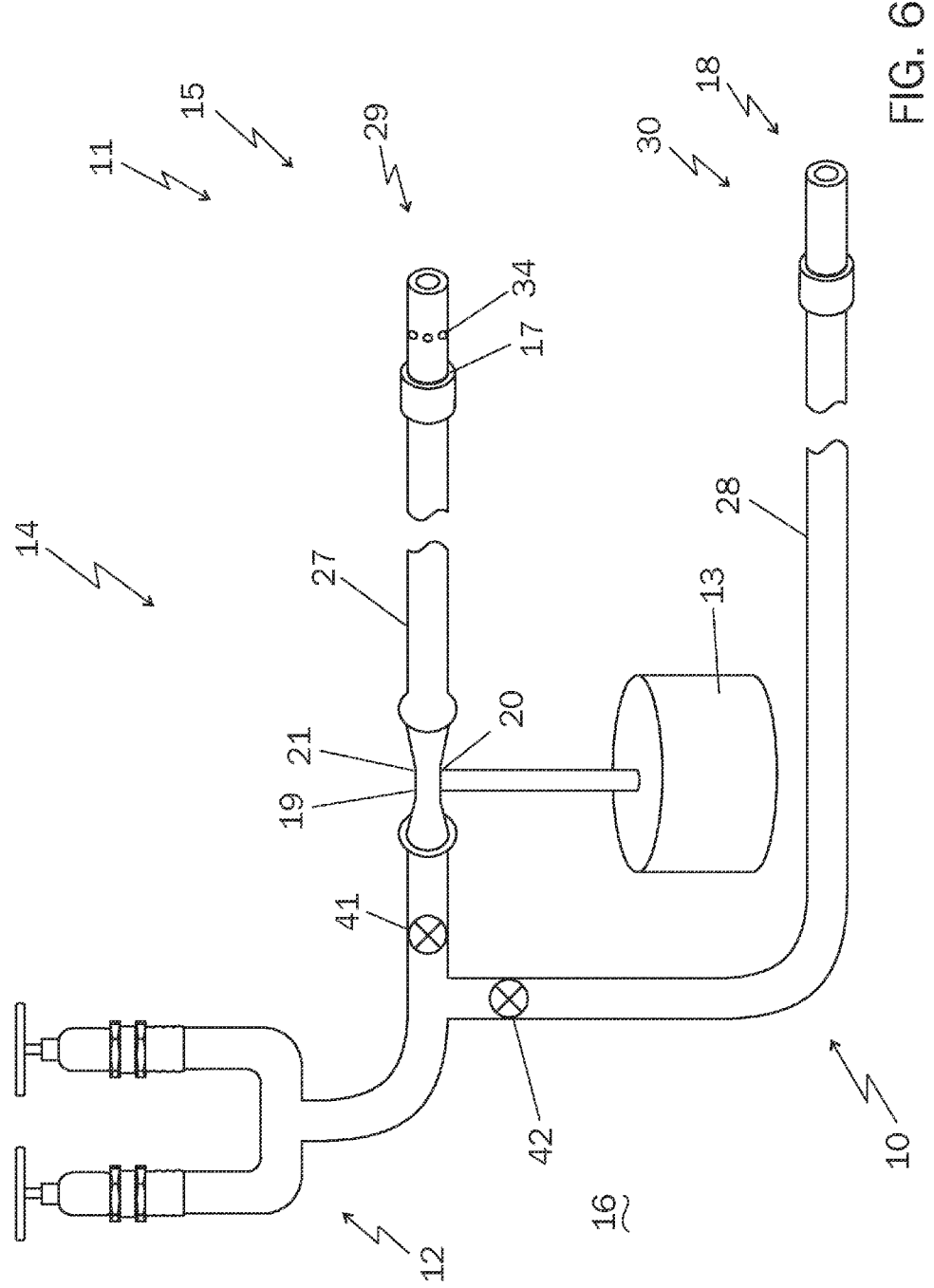
FIG. 6 is a schematic of a second embodiment of the undercoat removal system showing the venturi component and wash nozzle disposed into a shampoo/conditioning flow stream and a high pressure nozzle disposed into a rinsing stream.

Some groomers prefer to work with only one application apparatus at time and therefore prefer that the conditioning and removal water streams be separated. Therefore, nozzle 17 comprising only core element 33 of application apparatus 11 of this invention may be disposed into a shampoo/conditioning flow stream 27 having venturi 19 inserted thereinto while a complete nozzle 17 is disposed into a rinsing flow stream 28 as depicted in FIG. 6. Use of the application apparatus 11 of FIG. 6 is similar to that of FIGS. 1-5, except only core element 33 of nozzle 17 is disposed into a shampoo/conditioning flow stream 27 while core element 33 and sleeve 32 in retracted position are disposed into rinsing flow stream 28. Since only core element 33 of nozzle 17 is used in shampoo/conditioning stream 27, only high flow occurs thus drawing shampoo/conditioning agent into shampoo/conditioning flow stream 27 27. The ensuing water/shampoo mix will flow further outwardly from flow holes 34 in core element 33 and through orifice 36 in terminal end 31 in a shower like pattern with a central stream and multiple arching streams emanating from flow holes 34 for washing the animal. Since copious amounts of water along with conditioning agent is flowing from nozzle 17, the process of shampooing/conditioning the undercoat of the animal proceeds in the same manner as described above. When conditioning is complete, the groomer secures valve 41 in shampoo/conditioning flow stream 27 and hangs high flow, low pressure core element 33 of nozzle 17 on mounting hardware. The groomer then removes high pressure, low flow nozzle 17 from mounting hardware, opens valve 42 in rinsing flow stream 28 to permit water to flow from orifice 36 in high pressure, low flow mode 18 as described hereinbefore. As before, nozzle 17 with sleeve 32 extended over terminal end 31 of core element 33, high pressure, low flow mode 18 occurs and high pressure, low flow rinsing water readily flows therefrom for completion of the undercoat removal process. Therefore, another object of this invention has been accomplished, that of providing separate streams for low pressure, high flow water for application of shampoo/conditioning agent and high pressure, low flow water for removal of the conditioned undercoat.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. An animal undercoat removal system comprises a dual function nozzle and a venturi, said dual function nozzle has high flow and low flow modes, said nozzle cooperating with said venturi to provide for suction of surfactant into a flow stream in said high flow mode and denies incorporation of said surfactant into said flow stream in said low flow mode, said nozzle switchable from said high flow mode to said low flow mode by axially sliding a sleeve along a core element of said nozzle toward a discharge end thereof wherein said low flow mode increases pressure at said venturi to deny suction of said surfactant into said flow stream and switchable from said low flow mode to said high flow mode by axially sliding said sleeve along said core element of said nozzle toward a base end, said high flow mode increasing flow through said venturi for suction of surfactant into said flow stream.

2. An animal undercoat removal system as in claim 1 wherein said core element has radial apertures disposed therethrough.

3. An animal undercoat removal system as in claim 2 wherein said sleeve has an inner surface disposed inwardly from a terminal end thereof that is substantially greater in inside dimension than an outer surface of said core element, said inner surface bounded by a back wall of said sleeve.

4. An animal undercoat removal system as in claim 3 wherein said radial apertures in said core element admit air into said flow stream to foam said surfactant.

5. An animal undercoat removal system as in claim 4 wherein said nozzle is disposed remote from said venturi.

6. An animal undercoat removal system comprising a nozzle and venturi, said nozzle has low pressure and high pressure modes, said nozzle cooperating with venturi to provide for suction of a surfactant into a flow stream through said nozzle in said low pressure mode and denies incorporation of surfactant into said flow stream in said high pressure mode, said nozzle switchable from said high pressure mode to said low pressure mode by axially sliding a sleeve along a core element of said nozzle toward a base end thereof wherein said low pressure mode decreases pressure at said venturi to provide for suction of said surfactant into said flow stream and switchable from said low pressure mode to said high pressure mode by axially sliding said sleeve along said core element of said nozzle toward a discharge end thereof, said high pressure mode decreasing flow through said venturi to deny suction of surfactant into said flow stream.

7. An animal undercoat removal system as in claim 6 wherein said core element has radial apertures disposed therethrough.

8. An animal undercoat removal system as in claim 7 wherein said sleeve has an inner surface inwardly from a terminal end thereof that is substantially greater in inside dimension than an outer surface of said core element, said inner surface bounded by a back wall of said sleeve.

9. An animal undercoat removal system as in claim 8 wherein said radial apertures in said core element admit air into said flow stream to foam said surfactant.

10. An animal undercoat removal system as in claim 8 wherein said nozzle is disposed remote from said venturi.

11. An animal undercoat removal system comprising a dual flow mode nozzle and a venturi, said nozzle further comprising a core element and a sleeve element, said sleeve element axially slidable relative to said core element, said core element of said nozzle provided with fluid introduction apertures in an outer wall thereof, said sleeve element having at least one fluid passage associated therewith wherein movement of said sleeve element in one direction relative to said core element blocks said fluid introduction passages and thus reduces flow of a first fluid through said core element thus increasing a pressure of said first fluid and wherein movement of said sleeve element in an opposed direction relative to said core element at least partially uncovers said fluid introduction passages thus increasing said flow of said first fluid through said core element thereby reducing said pressure of said first fluid wherein said first fluid is foamed by introduction of a second fluid into said first fluid through said fluid introduction apertures.

12. An animal undercoat removal system as in claim 11 wherein said movement of said sleeve element toward a free end of said core element reduces said flow of said first fluid thus increasing said pressure of said first fluid and wherein movement of said sleeve element away from said free end of said core element increases said flow.

13. An animal undercoat removal system as in claim 12 wherein said fluid passage of said sleeve element is a space provided from a free end thereof between an inner surface of said sleeve element and an outer surface of said core element.

14. An animal undercoat removal system as in claim 11 wherein said movement of said sleeve element toward a free end of said core element increases said flow of said first fluid thus reducing said pressure of said first fluid and wherein movement of said sleeve element away from said free end of said core element decreases said flow and increases said pressure.

15. An animal undercoat removal system as in claim 14 wherein said fluid passage of said sleeve element is a plurality of axial spaces provided through a closed end thereof between an inner surface of said sleeve element and an outer surface of said core element.

16. An animal undercoat removal system as in claim 15 wherein said axial spaces align with said fluid introduction apertures in said core element of said nozzle.

* * * * *